United States Patent [19]

Murakami et al.

[11] 4,118,713
[45] Oct. 3, 1978

[54] TOTALLY OPENED F. VALUE INFORMATION INPUT SYSTEM OF LENS FOR A CAMERA WITH INTERCHANGEABLE LENSES

[75] Inventors: Hiroyashu Murakami, Tokyo; Tadashi Ito, Yokohama; Fumio Ito, Yokohama; Nobuaki Sakurada, Yokohama; Masaharu Kawamura, Hino; Nobuhiko Shinoda, Tokyo, all of Japan

[73] Assignee: Canon Kabushiki Kaisha, Tokyo, Japan

[21] Appl. No.: 785,770

[22] Filed: Apr. 7, 1977

Related U.S. Application Data

[63] Continuation of Ser. No. 621,126, Oct. 9, 1975, abandoned.

[30] Foreign Application Priority Data

Oct. 16, 1974 [JP] Japan .................................. 49-118952

[51] Int. Cl.² ............................................. G03B 7/08
[52] U.S. Cl. .............................. 354/23 D; 354/60 A; 354/286; 354/289
[58] Field of Search ................... 354/23 D, 43, 50, 51, 354/60 A, 286, 289

[56] References Cited

U.S. PATENT DOCUMENTS

| 3,906,534 | 9/1975 | Shirasaki ............................. 354/286 |
| 3,928,858 | 12/1975 | Sakurada et al. ................ 354/23 D |

Primary Examiner—Russell E. Adams
Attorney, Agent, or Firm—Toren, McGeady and Stanger

[57] ABSTRACT

At the side of the camera body, switches for treating the totally opened F value information of the photographic lens as coded digital information of a certain determined number of bits are connected to the digital exposure operation circuit. At the side of each of the photographic lens which is made interchangeable for the camera body, a signal pin is arranged for indicating the totally opened F value proper to the photographic lens as coded digital information of the above mentioned determined number of bits in such a manner that at the time of mounting the photographic lens on the camera body, the switches at the side of the camera body are closed in selected combination in accordance with the totally opened F value of the lens. Accordingly the totally opened F value of the photographic lens is put into the digital exposure operation circuit.

10 Claims, 9 Drawing Figures

TOTALLY OPENED F. VALUE INFORMATION INPUT SYSTEM OF LENS FOR A CAMERA WITH INTERCHANGEABLE LENSES

This is a continuation of Application Ser. No. 621,126 filed Oct. 9, 1975, now abandoned.

BACKGROUND OF THE INVENTION

1. Field of the Invention

The present invention relates to a totally opened F value information input system of the lens for a camera with interchangeable lenses, more particularly to a totally opened F value information input system of the lens by means of which system the totally opened F value information of the photographic lens is put in the digital exposure operation circuit at the side of the camera body as digital information.

2. Description of the Prior Art

When the totally opened F value (totally opened aperture value) of the photographic lens to be used is varied in the case of a camera with interchangeable lenses, presenting the so called TTL exposure control system by means of which the light beam coming from the object to be photographed through the lens is measured so as to determine the exposure value, (1) the absolute incident light amount for the light measuring element for measuring the brightness of the object to be photographed varies in accordance with the totally opened F value of the photographic lens to be used, whereby the light measuring element is included in the above mentioned TTL exposure control system and provided at a suitable position in the camera body at which the light beam coming from the object to be photographed through the photographic lens can be received, and (2) due to the different position of the light emitting pupils of the interchangeable lenses and others, the difference of the light amount on the light receiving plane of the light receiving element among the interchangeable lenses do not correspond to that on the focus plane (film plane) any more;

in such a manner that the light measurement state varies, whereby, in order to always obtain a sure and accurate operation of the exposure control system, it is essential to compensate the operation by giving the totally opened F value information of the photographic lens to be used to the exposure control system.

Until now the so called analogue amount transmitting method has been adopted for this purpose, whereby the totally opened F value of the interchangeable lens in question is indicated by the length of the signal pin in such a manner that, at the time of mounting the photographic lens on the camera body, a proper compensating device is operated in accordance with the projecting length of this signal pin so that the totally opened F value information of the photographic lens to be used is given to the exposure control system.

In the case of such method, it is necessary to strictly determine the size of each signal pin in accordance with the totally opened F value for the interchangeable lens. However, during the actual production as well as the actual mounting of this signal pin, there takes place a comparatively large error in its size. Since there is provided the above mentioned compensating device between this signal pin and the exposure control system, errors are apt to take place between them so that by means of such analogue amount transmitting method as mentioned above, it is difficult to put a precise totally opened F value information to the exposure control system, which is disadvantageous.

Quite recently, digital techniques have been introduced in the camera and it has been proposed to carry out the operation of the exposure, the indication of the determined exposure value (diaphragm value as well as shutter speed) or the control of the exposure device (diaphragm device or shutter device) and so on by means of digital circuits. Thus, it is necessary to convert the information transmitted as an analogue amount into the digital information. Hereby again errors occur.

In order to eliminate such inconveniences as mentioned above, U.S. Pat. No. 3,782,261 proposes "Data Transmission Device for Use with Interchangeable-Lens-Camera" which is so constructed that on an annular surface of the mount for the lens at the side of the camera body is provided a uniform circular array of data transmission elements, each of which is biased toward a projected position in which it sticks out of the camera mount annular surface, but can be pushed into a retracted position. On a corresponding annular surface of the mount at the side of the interchangeable lens are provided one or more arcuate slots adapted to receive loosely selected data transmission elements when the lens is mounted in its final position on the camera in such a manner that at the time of mounting the lens on the camera selected transmission elements are received in the slot or slots and thus remain in their projected position. Other data transmission elements are pushed into their retracted position by the annular surface of the lens mount so that the data to be transmitted from the lens to the camera is determined by the particular combination of retracted and projected data transmission element in a digital way.

The data transmission device proposed by the U.S. Pat. No. 3,782,261 is especially intended to the interchangeable lenses and the camera of the screw mount connecting system (by means of which system at the time of mounting the interchangeable lens on the camera body the lens is crewed in so as to be connected with the camera body and which system is distinguished from the bayonet mount connecting system) so that the uniform circular array of data transmission elements is combined with one or more slots as explained above whereby for the positioning of each data transmission elements on the annular surface of the camera mount as well as for determining the position of the arcuate slots on the annular surface of the lens mount and the form of the arcuate slots, a strict accuracy is requested and in consequence the accuracy at the time of the data transmission largely depends upon the positioning accuracy of the data transmission elements as well as the positioning and the size accuracy of the arcuate slots. This is done that at times the accurate and sure transmission of data can not be guaranteed, In addition, for the arrangement of data transmission elements as well as the working of the arcuate slots, sophisticated techniques are demanded so that the cost of the data transmission device as a whole goes up, which is not profitable.

SUMMARY OF THE INVENTION

With the above mentioned situations being taken into consideration, the principal purpose of the present invention is to offer a novel totally opened F value input system of lens suitable for putting the totally opened F value information of lens in the digital exposure operation circuit at the side of the camera as digital information from the beginning.

Another purpose of the present invention is to offer a totally opened F value information transmission system of lens by means of the digital information suitable for being adopted in the interchangeable lenses and the camera in which the so called bayonet mount connecting system is adopted in such a manner that the interchangeable lenses can be mounted on the camera without rotating them, contrary to the data transmission device for the camera having already been proposed by U.S. Pat. No. 3,782,261.

Further, another purpose of the present invention is to offer a particularly simple composition connected with the above mentioned two purposes, whereby the accurate totally opened F value information is always put in the camera side surely quite independent of the mechanical accuracy of the size of the components.

Being particularly connected with the above mentioned purpose according to a preferred embodiment of the present invention, the switches for treating the totally opened F value information of the photographic lens as coded digital information of a certain determined number of bits are connected to the digital exposure operation circuit at the side of the camera while in each photographic lens interchangeable for the camera body a signal pin for indicating the totally opened F value proper to the lens as the coded digital information of the above mentioned determined number of bits is provided in such a manner that at the time of mounting the photographic lens on the camera body the switches at the side of the camera body are closed in selected combination in accordance with the totally opened F value by means of the pin provided in the lens so that the totally opened F value information of the photographic lens is put in the digital exposure operation circuit.

Further other purposes as well as features of the present invention will be disclosed in the explanations to be made below as well as the accompanying drawings.

BRIEF DESCRIPTION OF THE DRAWINGS

The drawings show the systems in accordance with the present invention particularly adopted for the photographic camera with interchangeable lenses, whereby.

DETAILED DESCRIPTION OF THE PREFERRED EMBODIMENT

Below, a concrete embodiment of the system in accordance with the present invention adopted for a photographic camera with interchangeable lens will be explained according to the accompanying lens.

Figure 1:
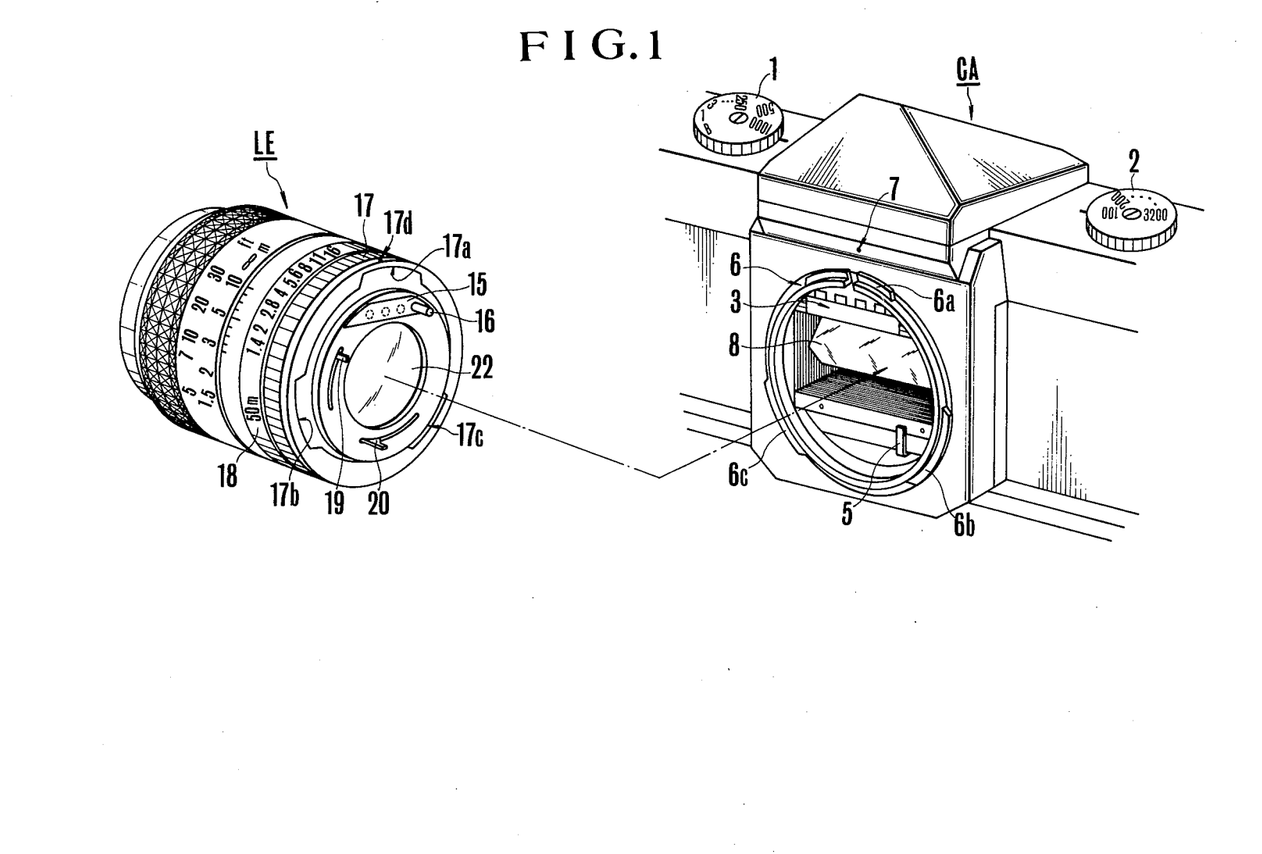
FIG. 1 shows the important part of the camera body and the interchangeable lens connected with the present invention in perspective view.
Figure 2:
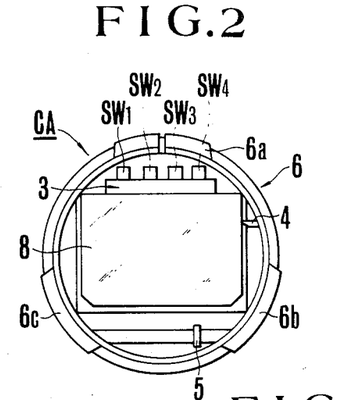
FIG. 2 shows a front view of the lens mount at the side of the camera shown in FIG. 1.
Figure 9:
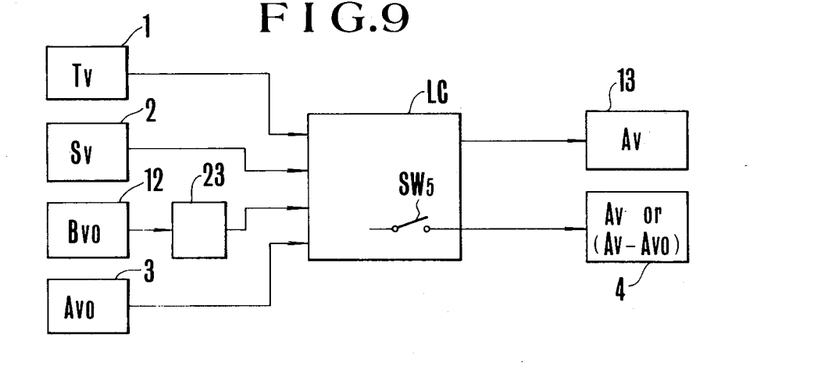
FIG. 9 shows a block diagram for showing a basic composition of the digital exposure control system of the above mentioned camera.

FIGS. 1 to 4 show the photographic camera body with interchangeable lenses presenting a digital exposure control system whose basic composition is shown with the block diagram of FIG. 9. In this camera body CA, 1 is the shutter speed setting dial, 2 the film sensitivity setting dial, whereby the shutter speed value (hereinafter represented by $Tv$) set by the dial 1 and the film sensitivity value (hereinafter represented by $Sv$) set by the dial 2 are put in the digital exposure operation circuit LC in the digital exposure control system shown in FIG. 9 as digital information for the exposure operation. 3 is the switch device for the totally opened F value information input provided in the neighborhood of the mount for the photographic lens in such a manner that the information of the totally opened F value (hereinafter represented by $Avo$) of the photographic lens mounted on the camera body CA is put in the above mentioned digital exposure operation circuit LC as coded digital information of a certain determined number of bits. Thus, the embodiment shown in detail in FIG. 2 presents four switches $Sw_1$, $Sw_2$, $Sw_3$ and $Sw_4$ for treating the totally opened F value information as coded digital information of four bits, which four switches are connected to the above mentioned digital exposure operation circuit LC.

4 is the aperture value signal transmission lever for transmitting the aperture value (hereinafter represented by $Av$ whereby the camera is the one capable of automatic exposure control with priority on shutter in which by setting the shutter speed in advance the aperture value is automatically processed and determined) determined by the digital exposure operation circuit LC to the side of the photographic lens, 5 the conventional automatic diaphragm operating lever for closing the diaphragm device at the side of the photographic lens down to the above mentioned aperture value before the actuation of the shutter at the time of taking a photograph and 6 the mount for the photographic lens composed as a conventional bayonet system mount presenting three claws 6a, 6b and 6c provided on a circle with the angle distance of 120° between each other. 7 is the mark for showing the standard mount position for the bayonet clamp ring provided in the photographic lens.

Figure 4:
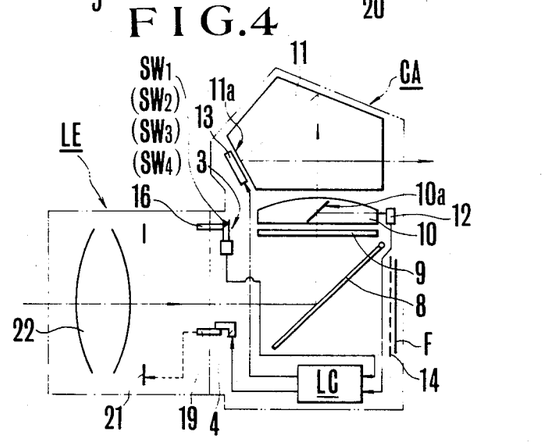
FIG. 4 shows the input state of the totally opened F value information in case the interchangeable lens is mounted on the camera body.

In FIG. 4, 8 is the conventional movable reflex mirror, 9 the focus plate, 10 the condenser lens presenting a semipermeable plane 10a slantly provided in the middle and 11 the pentagonal prism whose one reflection plane 11a is formed as semipermeable plane. 12 is the light measuring element for receiving a light beam coming from the object to be photographed through the photographic lens so as to produce a light measurement signal (hereinafter represented by $Bvo$), being arranged so as to receive the light beam reflected by the semipermeable plane 10a of the above mentioned condenser lens 10, whereby the output, namely the light measurement signal $Bvo$ is put in the digital exposure operation circuit LC as digital signal, being digitally converted by an analogue-digital converter 23, 13 is the indication means for indicating the aperture value Av determined by the above mentioned digital exposure operation circuit LC, being arranged opposite to the semipermeable plane 11a of the above mentioned pentagonal prism 11. 14 is the opening and closing member of the focal plane type shutter and F the film.

LE is the photographic lens mountable and dismountable on the above mentioned camera body CA. In the photographic lens LE, 16 is the signal pin for indicating the totally opened F value, being provided on the mount of the lens LE so as to indicate the totally opened F value Avo of the lens LE by means of the code basing upon the combination of the positions on the support plate 15 (15a–15d shown in FIGS. 3 and 6) with the number from 0 to 4, whereby the positions on the support plate 15 (15a–15d) respond with the positions of the switches $Sw_1$, $Sw_2$, $Sw_3$ and $Sw_4$ one to one so that at the time of mounting the photographic lens LE on the camera body CA the signal pin 16 closes the switch in the above mentioned switch device 3 in the position corresponding with that of the pin 16. Hereby by means of closing the switches $Sw_1$, $Sw_2$, $Sw_3$ and $Sw_4$ in a selected combination, the information of the totally opened F value Avo of the photographic lens LE is put in the digital exposure operation circuit LC as coded digital information.

Figure 3:
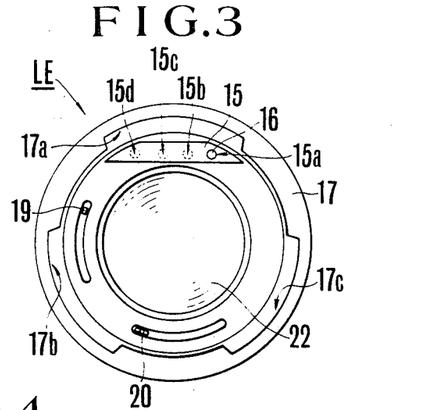
FIG. 3 shows a front view of the mount at the side of the interchangeable lens shown in FIG. 1.

17 is the bayonet clamp ring for lens mounting provided rotatably toward the lens body LE, presenting grooves 17a, 17b and 17c corresponding to the claws 6a, 6b and 6c provided on the mount 6 at the side of the camera body CA, whereby the clamp ring 17 is rotated for clamping at the time of mounting the lens LE on the camera body CA after the claws 6a, 6b and 6c respectively engage in the grooves 17a, 17b and 17c. In this way, the lens LE is mounted on the camera body CA without rotating its body.

17d is the mark for indicating the standard position of the clamp ring 17, whereby at the time of mounting the photographic lens LE on the camera body CA, 17d is set at the mark 7 at the side of the camera body CA.

18 is the diaphragm preset ring and 19 the diaphragm signal pin which engages with the aperture value signal transmission lever 4 at the side of the camera body CA at the time of mounting the lens LE on the camera body CA in such a manner that the transmission of the aperture value signal from the camera body CA to the lens LE.

20 is the diaphragm lever for actuating the diaphragm device 21 (FIG. 4), being capable of engaging with the automatic diaphragm operating lever 5 at the side of the camera body at the time of mounting the lens LE on the camera body CA in such a manner that the diaphragm device 21 is operated, being driven by means of the operating lever 5, so that the diaphragm is closed down to the aperture value determined by the diaphragm signal pin 19. 22 is the photographic optical system. Hereby the above mentioned diaphragm preset ring 18 is for manual setting of the diaphragm.

Figure 6:
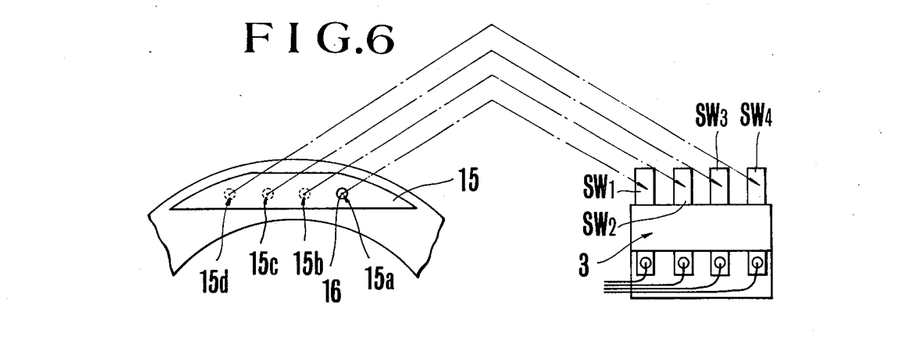
FIG. 6 shows the relation between the signal pin provided in each interchangeable lens for indicating the totally opened F value of the lens and the switches for the totally opened F value input at the side of the camera body.
Figure 7:
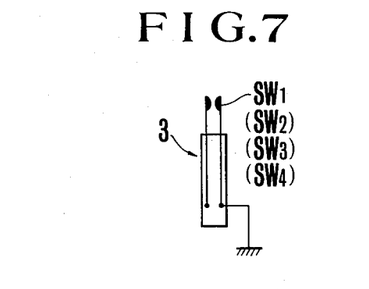
FIG. 7 shows a side view of the switches shown in FIG. 6.

Below, the coded totally opened F value Avo which the above mentioned signal pin 16 indicates by means of the combination of the positions on the support plate 15 (15a–15d) with the number will be explained below in accordance with FIG. 6. For the signal pin 16, 4 positions are provided in advance (namely the totally opened F value is represented as digital signal of 4 bits), and therefore it is possible to indicate $2^4$ (the fourth power of two) coded signals by means of the above mentioned combination, whereby the relation between the positions as well as the number of the signal pin 16 and the totally opened F value Avo is, for example, as follows. Now let us suppose that a photographic lens with totally opened F value of 1.0 (which means that the totally opened aperture ratio is 1.0, hereinafter briefly represented by F.No-1.0) be used. As the position 15a, 15b, 15c and 15d of the signal pin 16 on the support plate 15, it is so determined in advance that the position 15a indicates the F.No larger by $2^0$ stop (or step) in aperture value than 1.0, the position 15b the F.No larger by $2^1$ stop in aperture value than 1.0, the position 15c the F.No larger by $2^2$ stop in aperture value than 1.0 and 15d the F.No larger by $2^3$ stop in aperture value than 1.0. Namely the positions 15a, 15b, 15c and 15d respectively indicate F.No-1.4, F.No-2, F.No-4 and F.No-16.

Thus the photographic lens LE which presents the signal pin 16 only at the position 15a on the support plate 15 as is shown in FIGS. 1 and 3 has the totally opened F value of 1.4, namely F.No-1.4.

Figure 5:
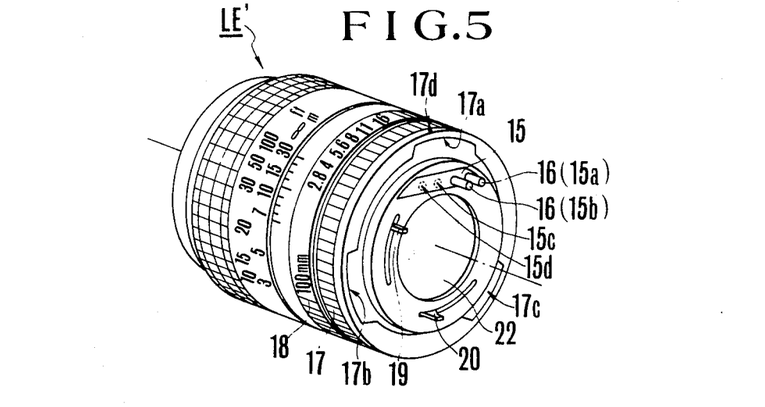
FIG. 5 shows the important part connected with the present invention, of an interchangeable lens with other totally opened F value than that of the interchangeable lens shown in FIG. 1.

On the other hand, as to the photographic lens LE' which presents the signal pin 16 at the positions 15a and 15b on the support plate 15 as is shown in FIG. 5, F.No is larger by $(2^0 + 2^1)$ stops in aperture value than 1.0, namely the totally opened F value of the photographic lens shown in FIG. 5 is 2.8, namely F.No-2.8.

Further connected with the above explanations, the treatment of the totally opened F value Avo of the lens will be explained below.

New let the film sensitivity value be Sv, the shutter speed value Tv, the aperture value Av and the pure brightness of the object to be photographed Bv, so a theoretical equation for the exposure operative $$Bv + Sv = Tv + Av \qquad (I)$$

is obtained according to the system of APEX (Additive System of Photographic Exposure).

Thus, in case of a camera capable of the automatic exposure control with priority on shutter as explained above, the aperture value Av is operated and determined by setting the film sensitivity value Sv and the shutter speed value Tv in advance and giving the brightness Bv of the object to be photographed, whereby it is to be noticed that the brightness Bv of the object to be photographed is given by the light measuring element 12. Namely this light measuring element 12 is arranged at the position at which the light beam coming from the object to be photographed through the photographic lens LE is received as is shown in FIG. 4 and therefore when the light measurement is carried out in the totally opened state of the diaphragm 21 of the photographic lens LE by means of the light measuring element 12 for the TTL light measurement, the output Bvo of the light measuring element 12 includes not only the information of the brightness Bv of the object to be photographed but also that of the totally opened F value Avo of the photographic lens LE, whereby the output Bvo of the light measuring element 12 varies in accordance with the totally opened F value Avo of the photographic lens as is expressed, for example, by $$Bvo = Bv - Avo \qquad (II)$$

Thus, with the output Bvo of this light measuring element 12 the brightness Bv of the object to be photographed must be obtained from the equation $$Bv = Bvo + Avo \qquad (III)$$

Namely, in case of the above mentioned type of camera it is necessary to give the information of the totally opened F value $Avo$ of the photographic lens to be used to the exposure control system in advance.

Hereby in case of the above mentioned type of the camera the exposure is operated basing upon the theoretical equation $$(Bvo + Avo) + Sv = Tv + Av \qquad (IV)$$

obtained from (I) and (II).

Below, the above explanation being taken into consideration, the operation of the camera composed as mentioned above at the time of taking a photograph, especially at the time of the totally opened F value information input of the photographic lens to be used will be explained.

At the time of mounting the photographic lens LE (or LE') on the camera body CA, at first the clamp ring 17 is rotated into a certain determined position for the lens mounting and then the mount at the side of the photographic lens LE (or LE') is placed opposite to the mount at the side of the camera body CA, while the mark 17d of the clamp ring 17 being set at the standard mark 7 at the side of the camera body CA. In this way the claws 6a, 6b and 6c provided on the mount 6 at the side of the camera body CA respectively engage in the grooves 17a, 17b and 17c provided in the clamp ring 17 of the photographic lens LE (or LE'), whereby when in this state the clamp ring 17 is rotated into a certain determined position, the photographic lens LE (or LE') is firmly mounted on the camera body CA, being clamped.

Figure 8:
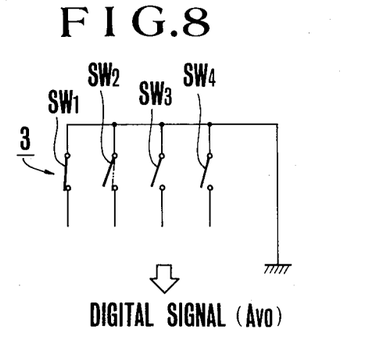
FIG. 8 shows the switch circuit diagram electrically equivalent to the switches for the totally opened F value input.

At the time of mounting this photographic lens LE (or LE') on the camera body CA, the signal pin 16 provided, being positioned, on the support plate 15 for indicating the totally opened F value at the side of the photographic lens LE (or LE') closes the switch provided at a position corresponding to that of the signal pin 16, of the switch device 3 for the totally opened F value information input at the side of the camera body in such a manner that the information of the totally opened F value $Avo$ of the photographic lens to be used is put in the exposure operation circuit LC (FIG. 4). Namely in case of the photographic lens LE with F.No-1.4 as shown in FIGS. 1 and 3, the signal pin 16 is provided only at the position 15a of the support plate and therefore only the switch $Sw_1$ of the switch device 3 is closed as is shown with a solid line in FIG. 8 in such a manner that the information of the totally opened F value corresponding to F.No-1.4 is put in the exposure operation circuit LC. Further in case of the photographic lens LE' with F.No-2.8 as is shown in FIG. 5, the signal pins 16 are provided at the positions 15a and 15b on the support 15 and therefore the switches $Sw_1$ and $Sw_2$ of the switch device 3 are closed as is shown with a solid line in FIG. 8 in such a manner that the information of the totally opened F value corresponding to F.No-2.8 is put in the exposure operation circuit LC.

Hereby at the time of mounting the photographic lens LE (or LE') on the camera body CA, the signal pin 19 at the side of the photographic lens and the diaphragm lever 20 respectively engage with the aperture value signal transmission lever 4 at the side of the camera body CA and the automatic diaphragm operating lever 5.

When then, by means of the dial 1 the desired shutter speed and by means of the dial 2, the sensitivity of the film in accordance with the sensitivity of the film to be used is set, the then shutter speed value $Tv$ and the then film sensitivity value $Sv$ are given to the exposure operation circuit LC as digital information.

When, in this state, the current source switch not shown in the drawing is closed so as to actuate the exposure control system, further the output $Bvo$ of the light measuring element 12 is given to the exposure operation circuit LC, whereby after all the information of the totally opened F value $Avo$ of the photographic lens to be used, that of the shutter speed value $Tv$, that of the film sensitivity value $Sv$ and the output $Bvo$ of the light measuring element 12 are put in the operation circuit LC in such a manner that the exposure is operated according to the above mentioned theoretical equation (IV) so as to determine the aperture value $Av$ which is put in the indication means 13. In consequence, it is possible for the user of the camera to set the aperture value of the diaphragm 21 by operating the diaphragm preset ring 18 at the side of the photographic lens in accordance with the information of the aperture value indicated by means of the indication means.

When, at this time, the switch $Sw_5$ in FIG. 9 is kept closed, the output of the operation circuit LC is given to the aperture value signal transmission lever as the aperture value $Av$ or the diaphragm closing amount $(Av-Avo)$, and transmitted to the photographic lens through the diaphragm signal pin 19 in such a manner that the aperture value of the diaphragm device 21 is automatically set so as to obtain a proper exposure at the time of taking a photograph.

The information of the totally opened F value $Avo$ of the photographic lens is put in the camera body as explained above in the case of the camera system in accordance with the present invention, whereby further the following explanations will be added, being connected with the above. As already explained in the case of the camera of the so called TTL-totally opened light measuring system by means of which the light beam coming from the object to be photographed through the photographic lens with the totally opened diaphragm is measured by the light measuring element so as to decide the exposure basing upon the then output of the light measuring element, when at the time of exchanging the photographic lens the totally opened F value differs, even if the brightness of the object to be photographed is same the absolute incident light amount for the above mentioned light measuring element varies in accordance with the totally opened F value $Avo$ of the photographic lens to be used, whereby the output $Bvo$ of the light measuring element varies as expressed, for example, by the already mentioned equation (II) so that it is necessary to give the information of the totally opened F value $Avo$ of the photographic lens to be used to the exposure control system in order to compensate the output of the light measuring element to be used (hereinafter called "Totally opened compensation"). The embodiment explained above is duly intended for this "Totally opened compensation", whereby what is to be taken into account beside the above is the fact that when the totally opened F value of the interchangeable lens differs, the relation of the difference of the light amount on the light receiving plane of the light measuring element between the interchangeable lenses often does not correspond to that of the difference of the light amount on the film plane between the interchangeable lenses so that there takes place an error in the light measurement. This is quite problematic in case of the photographic lens with small F value, namely the so called bright lens. Now let the above mentioned light measurement error signal be expressed by $Avc$, the output of the light measuring element is expressed as follows.

$$B'vo = Bv - Avo - Avc \qquad (V)$$

From the equationed (I), the then exposure operation equation is $$B'vo + (Avo + Avc) + Sv = Tv + Av \qquad (VI)$$

so that for the exposure operation it is necessary to give the information of this light measurement error $Avc$ to the operation circuit in advance, whereby the light measurement error $Avc$ is almost the function of the totally opened F value $Avo$ of the photographic lens and can be expressed as follows.

$$Avc = f(Avo) \qquad (VII)$$

In consequence for the above mentioned embodiment, it is possible to put the information of the totally opened F value in the exposure operation circuit in form of $(Avo + Avc)$ by means of the signal pin for indicating the totally opened F value at the side of the photographic lens.

As to how to introduce the information of this light measurement error $Avc$ into the operation circuit, it is also possible to put the information in the operation circuit in the same way as in case of the totally opened F value through other route for example by providing a signal pin for compensating this light measurement error at the side of the photographic lens. Further it can be so designed that only the information of the totally opened F value $Avo$ is put in the operation circuit in such a manner that the light measurement error $Avc$ is operated by the operation circuit itself basing upon the totally opened F value $Avo$ in accordance with the above mentioned equation (VII).

As explained above according to the system of the present invention it is possible to realize in a simple way a system for the totally opened F value information input of the lens by means of the digital information, being suited for the interchangeable lens and the camera in which the so called bayonet mount connecting system is adopted, whereby the interchangeable lens can be mounted on the camera body without rotating the lens body. Hereby further it is possible to put always the accurate totally opened F value of the lens in the camera body, quite independent of the mechanical size accuracy of the components.

The exposure operation circuit in the exposure control system is explained as a digital circuit in the embodiment, whereby it goes without saying that the analogue circuit be similarly constructed.

What is claimed is:

1. In a camera system comprising a camera body and an interchangeable photo-taking lens assembly, said camera body having a lens mount portion for mounting said taking lens assembly and lens mounting means adapted here for fixedly securing taking lens assembly to the camera body, and said taking lens assembly having a non-rotatable portion for being coupled with said lens mount portion of the camera body, a clamping means rotatable with respect to said non-rotatable portion, said clamping means being engageable with said lens mounting means to secure the taking lens assembly fixedly to the camera body, and said taking lens assembly being fixedly attachable to the camera body by rotating said clamping means with respect to said non-rotatable portion and engaging the same with said lens mounting means of the camera body at a state wherein the non-rotatable portion is coupled with said lens mount portion of the camera body by a linear operation substantially parallel to an optical axis of the lens assembly with no rotational motion; a system for providing a full open F value information of the taking lens assembly to the camera body as a coded electrical digital information of $n$ bits, said system comprising:

means for receiving a coded mechanical digital information of said $n$ bits corresponding to the full open F value of the taking lens assembly and for converting said mechanical digital information into the coded electrical digital information of said $n$ bits, said receiving and converting means being fixedly disposed at said lens mount portion of the camera body and having $n$ switch members so as to provide the full open F value information of the taking lens assembly as the coded electrical digital information of said $n$ bits when actuated by mechanical means for providing said full open F value information as the coded mechanical digital information of said $n$ bits; and mechanical means for providing the full open F value information of the taking lens assembly to said receiving and converting means as the coded mechanical digital information of said $n$ bits, said mechanical providing means being fixedly disposed on said non-rotatable portion of the taking lens assembly and having K mechanical signal members, wherein K represents an integer from 0 to $n$, to determine the ON-OFF condition of each of said $n$ switch members on the camera body side according to said full open F value of the taking lens assembly, said mechanical signal members having $n$ setting positions each respectively corresponding to each of said $n$ switch members on the camera body side and being able to provide $2^n$ different mechanical digital information by combination of said respective number (K) of the signal members being disposed and their positions, and being adapted to actuate said switch members according to the full open F value of the taking lens assembly when the taking lens assembly is attached to the camera body;

whereby the full open F value information of the taking lens assembly is provided to the camera body as coded electrical digital information of $n$ bits through the actuation of said receiving and converting means on the camera body side by said providing means on the taking lens assembly side at the time of attaching of the taking lens assembly to the camera body.

2. A system according to claim 1, wherein said camera body comprises exposure operation circuit means for operating exposure values of said camera system, said switch members being connected to said circuit means for supplying as an input the full open F value of the taking lens assembly into said circuit means as the electrical digital information of $n$-bits.

3. A system according to claim 2, wherein said camera body further comprises:

light measuring means for detecting the brightness of an object to be photographed by said camera system, said measuring means being disposed within said camera body at a position capable of receiving an object light coming through said taking lens assembly and connected to said exposure operation circuit means for providing object brightness information to the circuit means, said exposure operation circuit means operating the exposure values on the basis of the object brightness information provided by said light measuring means and the full open F value information provided by said switch members.

4. A system according to claim 3, wherein said exposure operation circuit means includes a digital operation circuit.

5. A camera system comprising in combination:
(A) a camera body, and
(B) an interchangeable photo-taking lens assembly being mountable on said camera body by linear operation substantially parallel to an optical axis thereof, said linear operation being without rotating motion of the taking lens, said camera body comprising:

a lens mount portion for mounting said taking lens assembly, lens mounting means adapted for fixedly securing the taking lens assembly to the camera body, exposure operation circuit means for operating exposure values of the camera system, and means for receiving a coded mechanical digital information of said $n$ bits corresponding to the full open F value of the taking lens assembly and for converting said mechanical digital information into the coded electrical digital information of said $n$ bits, said receiving and converting means being fixedly disposed at said lens mount portion of the camera body and having $n$ switch members so as to provide the full open F value information of the taking lens assembly as the coded electrical digital information of said $n$ bits when actuated by mechanical means for providing said full open F value information as the coded mechanical digital information of said $n$ bits, said electrical digital information being supplied to said circuit means; and said taking lens assembly comprising:

a non-rotatable portion for being coupled with said lens mount portion of the camera body, a clamping means rotatable with respect to said non-rotatable portion, said clamping means being engageable with said lens mounting means of the camera body to secure fixedly the taking lens assembly to the camera body, said taking lens assembly being fixedly attachable to the camera body by rotating said clamping means with respect to said non-rotatable portion and engaging the same with said lens mounting means of the camera body at a state wherein the non-rotatable portion is coupled with said lens mount portion of the camera body by a linear operation substantially parallel to an optical axis of the lens assembly with no rotational motion, and mechanical means for providing the full open F value information of the taking lens assembly to said receiving and converting means as the coded mechanical digital information of said $n$ bits, said mechanical providing means being fixedly disposed on said non-rotatable portion of the taking lens assembly and having K mechanical signal members, wherein K represents an integer from 0 to $n$, to determine the ON-OFF condition of each of said $n$ switch members on the camera body side according to said full open F value of the taking lens assembly, said mechanical signal members having $n$ setting positions each respectively corresponding to each of said $n$ switch members on the camera body side and being able to provide $2^n$ different mechanical digital information by combination of said respective number (K) of the signal members being disposed and their positions, and being adapted to actuate said switch members according to the full open F value of the taking lens assembly when the taking lens is attached to the camera body;

whereby the full open F value information of the taking lens assembly is provided to the camera body as coded electrical digital information of $n$ bits through the actuation of said receiving and converting means on the camera body side by said providing means on the taking lens assembly side at the time of attaching of the taking lens assembly to the camera body.

6. A camera system according to claim 5, wherein said camera body further comprises: light measuring means for detecting the brightness of a scene to be photographed, said measuring means being disposed within said camera body at a position capable of receiving a scene light coming through said taking lens assembly and connected to said exposure circuit means for providing scene brightness information to said circuit means, said exposure operation circuit means operating the exposure values on the basis of the scene brightness information provided by said light measuring means and the full open F value information provided by said switch members.

7. A camera system according to claim 6, wherein said exposure operation circuit means includes a digital operation circuit means having a digital operation circuit, said digital circuit being connected to said switch members and said light measuring means.

8. An interchangeable photo-taking lens for use with a camera body, said camera body comprising:

a lens mount portion for mounting said taking lens assembly, lens mounting means adapted for fixedly securing the taking lens assembly to the camera body, and means for receiving a coded mechanical digital information of said $n$ bits corresponding to the full open F value of the taking lens assembly and for converting said mechanical digital information into the coded electrical digital information of said $n$ bits, said receiving and converting means being fixedly disposed at said lens mount portion of the camera body and having $n$ switch members so as to provide the full open F value information of the taking lens assembly as the coded electrical digital information of said $n$ bits when actuated by mechanical means for providing said full open F value information as the coded mechanical digital information of said $n$ bits, said taking lens assembly comprising:

a non-rotatable portion for being coupled with said lens mounting portion of the camera body, a clamping means rotatable with respect to said non-rotatable portion, said clamping means being engageable with said lens mounting means of the camera body to secure fixedly the taking lens assembly to the camera body, said taking lens assembly being fixedly attachable to the camera body by rotating said clamping means with respect to said non-rotatable portion and engaging the same with said lens mounting means of the camera body at a state wherein the non-rotatable portion is coupled with said lens mount portion of the camera body by a linear operation substantially parallel to an optical axis of the lens assembly with no rotational motion, and mechanical means for providing the full open F value information of the taking lens assembly to said receiving and converting means as the coded mechanical digital information of said $n$ bits, said mechanical providing means being fixedly disposed on said non-rotatable portion and including K mechanical signal members, wherein K represents an integer from 0 to $n$, to determine the ON-OFF condition of each of said $n$ switch members on the camera body side according to said full open F value of the taking lens assembly, said mechanical signal members having $n$ setting portions on the camera body side and being able to provide $2^n$ different mechanical digital information by combination of said respective number (K) of the signal members being provided and their positions, and being fixedly adapted to actuate said switch members according to the full open F value of the taking lens assembly when the taking lens assembly is attached to the camera body.

9. An interchangeable photo-taking lens assembly for use with a camera body, said camera body comprising:
a lens mount portion for mounting said taking lens assembly,
lens mounting means adapted for fixedly securing the taking lens assembly to the camera body,
exposure operation circuit means for operating exposure values, and
means for receiving a coded mechanical digital information of said $n$ bits corresponding to the full open F value of the taking lens assembly and for converting said mechanical digital information into the coded electrical digital information of said $n$ bits, said receiving and converting means being fixedly disposed at said lens mount portion of the camera body and having $n$ switch members so as to provide the full open F value information of the taking lens assembly as the coded electrical digital information of said $n$ bits when actuated by mechanical means for providing said full open F value information as the coded mechanical digital information of said $n$ bits;

said taking lens assembly comprising:
a non-rotatable portion for being coupled with said lens mounting portion of the camera body, a clamping means rotatable with respect to said non-rotatable portion, said clamping means being engageable with said lens mounting means of the camera body to secure fixedly the taking lens assembly to the camera body, said taking lens assembly being fixedly attachable to the camera body by rotating said clamping means with respect to said non-rotatable portion and engaging the same with said lens mounting means of the camera body at a state wherein the non-rotatable portion is coupled with said lens mount portion of the camera body by a linear operation substantially parallel to an optical axis of the lens assembly with no rotational motion; and mechanical means for providing the full open F value information of the taking lens assembly to said receiving and converting means as the coded mechanical digital information of said $n$ bits, said mechanical providing means being fixedly disposed on said non-rotatable portion of the taking lens assembly and including K mechanical signal members, wherein K represents an integer from 0 to $n$, to determine the ON-OFF condition of each of said $n$ switch members on the camera body side according to said full open F value of the taking lens assembly, said mechanical signal members having $n$ setting positions and being able to provide $2^n$ different mechanical digital information by combination of said respective number (K) of the signal members being provided and their positions, and being adapted to actuate said switch members according to the full open F value of the taking lens assembly when taking the lens assembly is attached to the camera body.

10. In a camera system comprising a camera body and an interchangeable photo-taking lens assembly, said camera body having a lens mount portion for mounting said taking lens assembly and lens mounting means adapted here for fixedly securing taking lens assembly to the camera body, and said taking lens assembly having a non-rotatable portion for being coupled with said lens mount portion of the camera body, a clamping means rotatable with respect to said non-rotatable portion, said clamping means being engageable with said lens mounting means to secure the taking lens assembly fixedly to the camera body, and said taking lens assembly being fixedly attachable to the camera body by rotating said clamping means with respect to said non-rotatable portion and engaging the same with said lens mounting means of the camera body at a state wherein the non-rotatable portion is coupled with said lens mount portion of the camera body by a linear operation substantially parallel to an optical axis of the lens assembly with no rotational motion; a system for providing a fixed specific information of the taking lens assembly to the camera body as a coded electrical digital information of $n$ bits, said system comprising:

means for receiving a coded mechanical digital information of said $n$ bits corresponding to a fixed specific information of the taking lens assembly and for converting said mechanical digital information into the coded electrical digital information of said $n$ bits, said receiving and converting means means being fixedly disposed at said lens mount portion of the camera body and having $n$ switch members so as to provide a fixed specific information of the taking lens assembly as the coded electrical digital information of said $n$ bits when actuated by mechanical means for providing said fixed specific information as the coded mechanical digital information of said $n$ bits; and mechanical means for providing a fixed specific information of the taking lens assembly to said receiving and converting means as the coded mechanical digital information of said $n$ bits, said mechanical providing means being fixedly disposed on said non-rotatable portion of the taking lens assembly and having K mechanical signal members, wherein K represents an integer from 0 to $n$, to determine the ON-OFF condition of each of said $n$ switch members on the camera body side according to said fixed specific information of the taking lens assembly, said mechanical signal members having $n$ setting positions each respectively corresponding to each of said $n$ switch members on the camra body side and being able to provide $2^n$ different mechanical digital information by combination of said respective number (K) of the signal members being disposed and their positions, and being adapted to actuate said switch members according to a fixed specific information of the taking lens assembly when the taking lens assembly is attached to the camera body;

whereby a fixed specific information of the taking lens assembly is provided to the camera body as coded electrical digital information of $n$ bits through the actuation of said receiving and converting means on the camera body side by said providing means on the taking lens assembly side at the time of attaching of the taking lens assembly to the camera body.

* * * * *